July 7, 1959 W. B. WARREN ET AL 2,893,185
APPARATUS FOR JOINING AND SEALING ARTICLES UNDER PRESSURE
Filed Nov. 1, 1957 4 Sheets-Sheet 1

William B. Warren,
Fred Wohlman,
INVENTORS.

BY

ATTORNEY.

July 7, 1959     W. B. WARREN ET AL     2,893,185
APPARATUS FOR JOINING AND SEALING ARTICLES UNDER PRESSURE
Filed Nov. 1, 1957     4 Sheets-Sheet 4
Fig. 4.
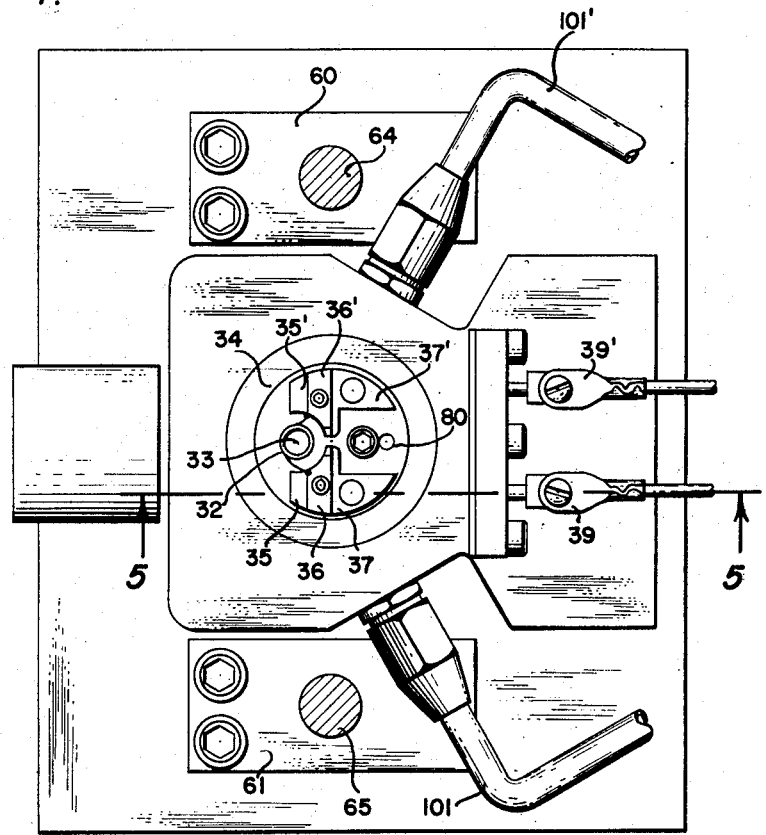
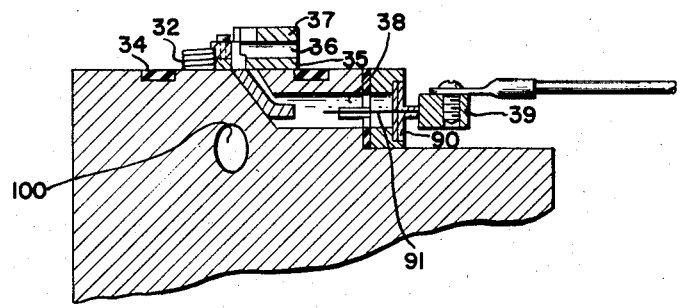
Fig. 5.
William B. Warren,
Fred Wohlman,
INVENTORS.
BY.
ATTORNEY United States Patent Office 2,893,185
Patented July 7, 1959

2,893,185

APPARATUS FOR JOINING AND SEALING ARTICLES UNDER PRESSURE

William B. Warren, Los Angeles, and Fred Wohlman, Inglewood, Calif., assignors to Hughes Aircraft Company, Culver City, Calif., a corporation of Delaware Application November 1, 1957, Serial No. 694,021

8 Claims. (Cl. 53—86)

This invention relates to apparatus for joining and sealing containers and the like under pressure whereby an atmosphere of desired composition and of predetermined pressure can be hermetically sealed within the container. More particularly, but not necessarily exclusively, the invention relates to apparatus for joining and sealing by fusion the containers for semiconductor devices whereby these devices may be provided in a package with an atmosphere of predetermined pressure hermetically sealed therein.

In the co-pending applications of Cutler, S.N. 687,494, filed October 1, 1957, and of Warren and Bender, S.N. 687,385, filed concurrently therewith, and assigned to the instant assignee, it is pointed out that the electrical performance and the production yield of semiconductor devices such as junction diodes may be markedly improved by providing and maintaining a pressure, generally greater than that of one atmosphere, around the device in the hermetically sealed package therefor. In these applications several methods are disclosed for providing the desired sealed-in pressure. Warren and Bender, in particular, disclose a method whereby the finally assembled device and the package therefor are placed in an atmosphere and sealed therein under a pressure greater than that ultimately desired in the package. The present invention relates to apparatus for sealing such an assembly according to this method.

It will be appreciated that sealing such devices under pressure is accompanied by several problems, especially where the sealing is accomplished by heat-fusing the components of the containers. In the case of glass containers, for example, reducing the external pressure surrounding the sealed package before the fused glass portions have had an opportunity to harden and set, may result in bulging or bursting of the walls of the package since the internal pressure thereof will be greater than the external surrounding pressure. It is also extremely important that precise tolerance and alignment limits be maintained in assembling and sealing semiconductor devices. In addition, the mass-production of such devices is rendered considerably more difficult by the necessity of sealing the containers for the devices in an atmosphere under pressure.

It is therefore an object of the instant invention to provide an improved apparatus for joining and sealing objects in an atmosphere under a pressure greater than atmospheric.

Another object of the invention is to provide an improved apparatus for assembling and sealing semiconductor devices and the containers therefor in an atmosphere under a pressure greater than atmospheric.

A further object of the invention is to provide an improved apparatus whereby a semiconductor device may be provided in a sealed package enclosing an atmosphere of predetermined composition and pressure.

Another object of the invention is to provide an improved apparatus for joining and sealing under pressure a glass bead carried by an electrode to a glass tube containing a semiconductor device whereby precise alignment and contact between the electrode and the device may be obtained while providing a predetermined pressure in the sealed assembly.

These and other objects and advantages of the invention are realized by providing apparatus whereby the parts of the container to be sealed are supported and spaced in axially opposed positions with respect to each other with an open-ended, closable pressure-chamber therebetween. By moving one of the supports for one of the parts of the container, the opposed parts of the container are brought together within the pressure-chamber and after establishment of the predetermined pressure therein, heat is applied to the container parts to cause the fusion thereof. After the cessation of the heating operation, the pressure is maintained in the chamber for a period of time long enough to permit the package to adapt itself to withstand the effects of having an internal pressure greater than the external ambient pressure. Thereafter, the movable support is returned to its initial "open" position thereby opening the pressure-chamber. By adapting the pressure-chamber to move with the movable support, it may be made to assume an intermediate position between the supports, thereby facilitating the loading and unloading of the apparatus.

The invention will be described in greater detail by reference to the drawings wherein:

Figure 4 is a plan view, partially in section, taken along the line 3—3 of Figure 2;

Figure 5 is a fragmentary, elevational view, in section, as taken along the line 4—4 of Figure 3;

Figure 1:
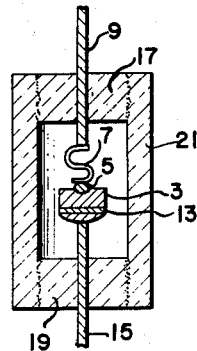
Figure 1 is a cross-sectional, elevational view of a typical glass-packaged semiconductor device joined and sealed by the apparatus of the invention.

A typical semiconductor device which may be assembled and sealed by the apparatus of the invention is a p-n junction diode device such as shown in Figure 1. This device may comprise a semiconductor body 3 of arsenic-doped n-type silicon, for example. A p-n rectifying junction may be established in the semiconductor body by fusing a button 5 of p-type material such as aluminum, for example. An S-shaped wire or whisker 7 provides ohmic contact to the button 5 by having one end thereof in pressure contact therewith. The whisker 7 may be platinum-iridium alloy. The other end of the S-shaped whisker 7 is spot-welded to a lead-in electrode 9 of copper-sheathed iron-nickel alloy, for example. Ohmic contact to the base region of the semiconductor body 3 may be provided by evaporating and depositing thereon a layer 13 of a gold-antimony alloy, for example. A second lead-in electrode 15 of copper-sheathed iron-nickel alloy, for example, is soldered or otherwise fused with the gold antimony layer 13. Both of the lead-in electrodes 9 and 15 are fused to and integral with the glass beads 17 and 19, respectively, which in turn are fused or otherwise integrally sealed to a glass tubulation 21. Thus the lead-in electrodes 9 and 15 are coaxially disposed in the hermetically sealed package for the device.

The diode device shown in Figure 1 is manufactured and assembled in the following manner. The lead-in electrodes 9 and 15 are first fused to the glass beads 17 and 19, respectively. Thereafter the lead-in electrode 15 with its bead 19 is inserted into one end of the glass tubulation 21 and fused thereto. The semiconductor body 3 is then inserted into the tubulation 21 so that the surface containing the fused button 5 faces the open end of the tubulation. The alloy layer 13 is then soldered or otherwise fused to the lead-in electrode 15. The S-shaped whisker 7, which is spot-welded to the lead-in electrode 9 after this electrode has been fused to the glass bead 17, is then inserted into the remaining open end of the tubulation 21 so as to bring the whisker 7 into pressure contact with the button 5 whereupon the bead 17 is fused to the tubulation 21. Heretofore this final sealing step was carried out under normal atmospheric pressure.

Figure 2:
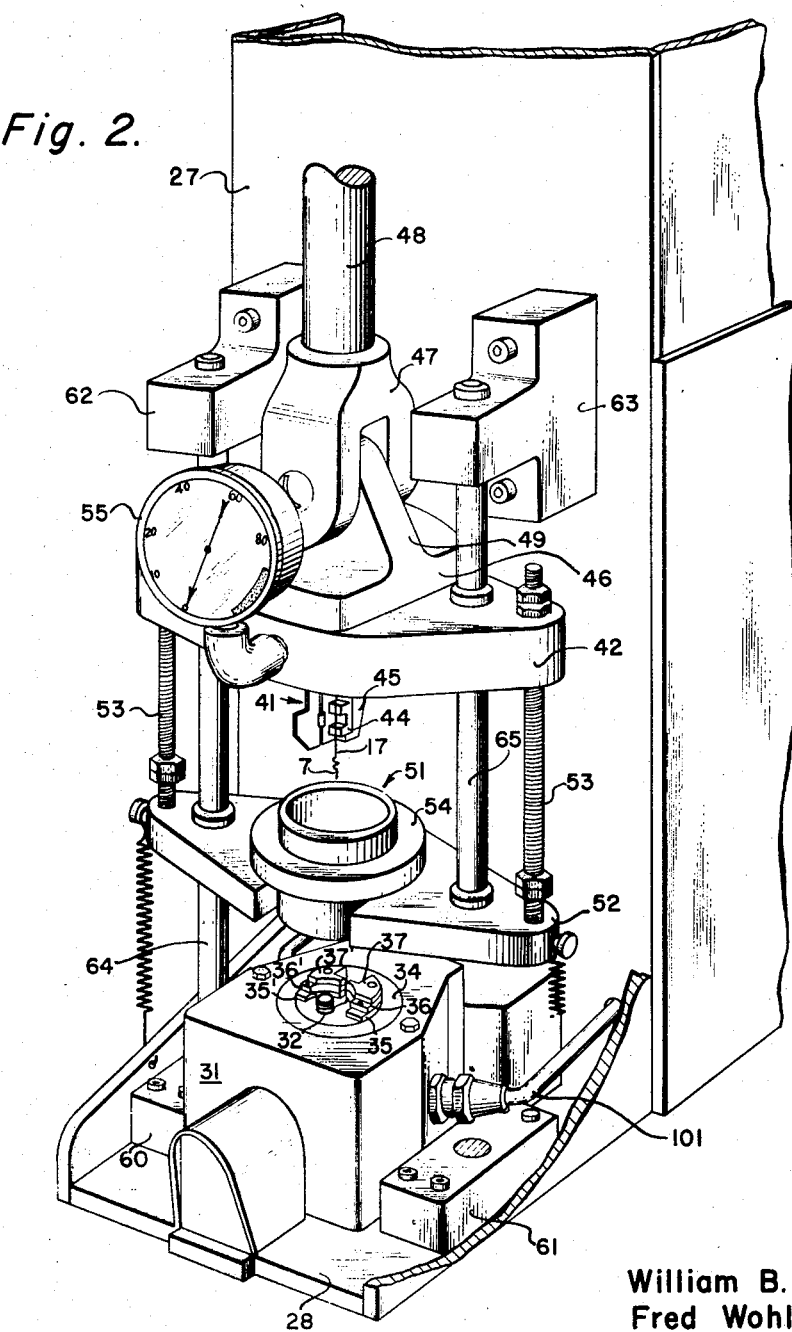
Figure 2 is a front view in perspective of the pressure-sealing apparatus of the invention in the "open" position.

According to the aforementioned Warren and Bender application a sealed-in pressure of any desired magnitude may be provided within the package for a semiconductor device by performing this final sealing operation in an atmosphere under a pressure substantially greater than that ultimately desired in the package. Referring now to Figure 2, apparatus is shown for carrying out this method of sealing and of achieving a sealed-in pressure. Not only may any desired pressure be provided by the apparatus of the invention but also the devices may be rapidly assembled and the components thereof brought into proper alignment with respect to each other while also obtaining the proper pressure contact between the whisker 7 and the button 5. The apparatus of Figure 2 comprises a stationary base block platform 31 having a heating coil 32 mounted thereon and coaxially disposed with respect to a tubular hole or bore 33 in the base block which holds the glass tubulation 21 with the semiconductor body 3 and the lead-in electrode 15 mounted therein as described previously. The lead-in electrode 9 with its glass bead 17 is carried by a holder 41 indicated generally by the reference numeral. The upper holder 41 is supported by an upper movable carriage 42 disposed above the base block platform 31. Coaxially positioned between the base platform 31 and the upper carriage 43 is a cylindrical pressure chamber 51 whose upper and lower ends are open. The pressure chamber 51 is secured to a carriage 52 which in turn is secured to the upper carriage 42 by means of a pair of rods 53. In order to facilitate the loading and unloading of the respective components to be sealed together, the pressure chamber 51 is adapted to assume an "at rest" position between the base platform 31 and the upper holder 41 and its carriage 42. Upon being driven downwardly, the upper carriage 42 carries the pressure chamber 51 down around the heating coil 32 and the holding means 33 in the base platform 31 and into contact with the base platform which thus closes the lower end of the pressure chamber. The upper carriage 42 continues to move downwardly so as to insert the lead-in electrode-glass bead assembly 9—17 a fixed distance into the open end of the tubulation 21 to obtain the proper pressure contact between the whisker 7 and the button 5. At this point the open upper end of the pressure chamber 51 is hermetically closed by the upper carriage 42 and the glass bead 17 and the portions of the tubulation 21 to be sealed together are disposed within the heating coil 32. Gas is then pumped into the pressure chamber 51 to a predetermined pressure. Thereafter, energy is supplied to the heating coil 32 to raise the temperature of the glass bead 17 and the portions of the tubulation 21 in contact therewith, thereby fusing these components.

Describing the apparatus in greater detail, an upright support frame 27 is provided having a base plate 28 extending outwardly from the base thereof and at right angles thereto. The base platform 31, consisting of a machined metal block, is secured to the base plate 28.

Disposed on either side of the base block 31 and secured to the base plate 28 are a pair of rectangular shoulder brackets 60 and 61. Secured to an upper portion of the support frame 27 are a pair of T-brackets 62 and 63 which are aligned with respect to the shoulder brackets 60 and 61, respectively. A pair of guide rods 64 and 65 are secured to and between the upper T-brackets 62 and 63 and the bottom shoulder brackets 60 and 61, respectively.

On the upper surface of the base platform 31 is provided a recess adapted to receive a ring 34 of resilient material such as rubber or the like. The mean diameter of this ring 34 is the same as the mean diameter of the cylindrical pressure chamber 51 which comes into contact with the resilient ring 34 when driven downwardly as will be explained in greater detail hereinafter.

Figure 3:
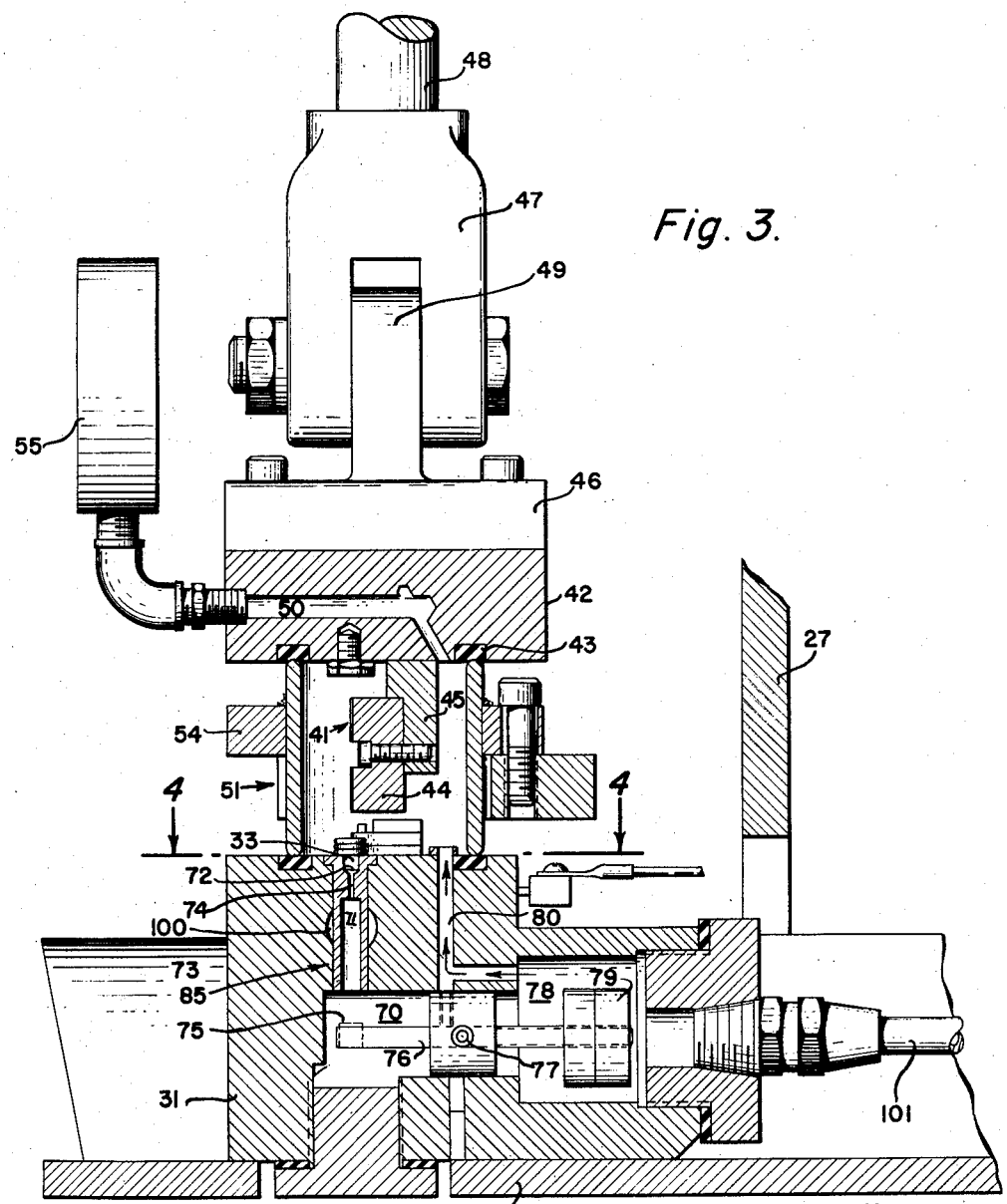
Figure 3 is an elevational view, partially in section, of the pressure-sealing apparatus shown in Figure 1 in the "closed" position.

Referring more particularly to Figure 3, there is provided in the base platform 31 a cylindrical chamber 70 in which tension-adjusting apparatus is disposed. The tubular bore 33 which holds the tubulation 21 is coaxially positioned with respect to a channel 71 which descends vertically into the base platform 31 providing communication between the tubular hole 33 and the chamber 70. The channel 71 is formed by a tubular member 85 which is inserted into a vertical hole in the base block 31. The tubular member 85 is machined so as to provide the bore 33 in the upper portion thereof a narrower central portion 74 and a wider lower portion 73. In this manner a shoulder 72 is provided upon which the tubulation 21 may be seated when inserted into the bore 33 with the lead-in electrode 15 extending down into and through the narrow central portion 74. Directly beneath the vertical channel 71 is a magnetic member 75 which is mounted on one end of a lever arm 76 which is pivotally supported for movement in a vertical plane by means of an axle 77 secured in the side walls of the base platform 31 forming the chamber 70. The other end of the lever arm 76 extends out into a second cylindrical chamber 78 of larger diameter than and coaxially aligned with respect to the internal chamber 70. This end of the lever arm is threaded and has a movable weight 79 mounted thereon. When the lead-in electrode 15 is inserted down through the channel 71, positive contact with the lever arm 76 is assured by the magnetic member 75 mounted thereon. It will thus be appreciated that by this means the contact pressure between the whisker 7 on the lead-in electrode 9 and the semiconductor body 3 in the tubulation 21 may be adjusted and established by means of the weight on the lever arm 76 when the lead-in electrode 9 is inserted in the tubulation 21 during operation of the apparatus.

Referring particularly to Figures 4 and 5 the structure for supporting the heating coil 32 and for supplying electric current thereto is shown and comprises two complementary sets of stacked semicircular plates whose central portions are curved so as to partially surround the heating coil 32 which is itself disposed over the holder or bore 33 on the base platform 31. The bottom plates 35—35' are of electrically insulating material such as heat resistant glass of the type known as "Fiberglas," for example. The intermediate plates 36—36' are electrically conductive and constitute current-carrying electrodes which are bolted to the insulating plates 35—35' which in turn are separately bolted to the base platform 31. The top plates 37—37' of metal are bolted or otherwise secured to the base platform 31 through the electrode plates 36—36' and the insulating plates 35—35'. The ends of the plates, facing the operator of the apparatus, are stepped with respect to each other so as to provide ready access to the bore 33 by the operator while loading and unloading the apparatus. Each of the two terminals of the heating coil 32 is secured respectively between the top plates 37—37' and the electrode plates 36—36' by bolting down of the top plates 37—37'. In this manner the heating coil 32 may be readily replaced by removal of only the top plates 37—37'.

A pair of channels 38—38', only one of which is shown in Figure 5, provides communication from the rear lateral surface of the base platform 31 to the top surface thereof within the resilient ring 34. Studs 39—39' are mounted and anchored in these channels 38—38', respectively, and electrically insulated from the base platform 41 by means of glass washers 90—90' (only one of which is shown) which are sealed in the channels 38—38'. The studs 39—39' are electrically connected to the electrode plates 36—36', respectively, by means of heavy rigid wires 91—91', only one of which is shown in Figure 5. These wires, 91—91', are secured to the studs 39—39' and pass through the glass washers 90—90' and up through the channels 38—38' and thence through the insulating plates 35—35' to the electrode plates 36—36'.

Also provided in the base platform 31 is a horizontally extending channel 100 which passes through the base platform 31 from one side thereof to the other and has terminal openings provided therein in the lateral surfaces thereof. This channel is connected by means of the pipes 101—101' to a source of substantially constant temperature liquid coolant which circulates therethrough. As shown in Figure 3, the channel passes around the vertically disposed tubular member 71 so as to cool this member and the surrounding portions of the base block 31. In this manner the temperature of the base block as well as the temperature of the tubulation 21 when mounted in the bore 33 of the tubular member 71 may be controlled and prevented from becoming excessively hot which might prove not only dangerous to the operator but also detrimental to the sealing operation.

The pressure chamber 51 comprises an open-ended metal cylinder and is provided with a collar portion 54 which is bolted or otherwise secured to a horizontally extending metal support or carriage 52. The horizontally extended wing portions of the carriage 52 are provided with holes through which the guide rods 64 and 65 pass and along which the carriage 52 is adapted to move. Thus the carriage 52, and hence the pressure chamber 51, may be aligned and maintained in alignment with the base platform 31 so that the lower edge of the pressure chamber 51 will contact the resilient ring 34 in the base platform so as to form an airtight seal therewith. The pressure chamber carriage 52 is also secured to the upper driving carriage 42 by means of a pair of spring-loaded rods 53 to which both carriages are secured thus permitting the distance between the two carriages to be adjusted and maintained as desired. It will thus be appreciated that by this arrangement, the pressure chamber 51 and its carriage 52 will move downwardly concomitantly with downward travel of the upper driving carriage 42 until the pressure chamber 51 encounters resistance to such movement by contact with the resilient ring 34 in the base platform 31. At this point the pressure chamber 51 and its carriage substantially stops while the upper driving carriage 42 continues to travel downwardly, exerting a force on the pressure chamber 51 to perfect the sealing action thereof with the resilient ring 34.

The upper driving carriage 42, which is shaped and sized substantially the same as the pressure chamber carriage 52, is provided with a pair of holes in the outwardly extending wing portions thereof through which the guide rods 64 and 65 pass thus aligning the upper carriage with both the pressure chamber carriage 52 and the base platform 31 are explained heretofore. The upper carriage 42 is provided with a recessed ring 43 of resilient material such as rubber or the like whose mean diameter is substantially equal to the mean diameter of the pressure chamber 51. Thus when the pressure chamber 51 has been driven downwardly into contact with the resilient ring 34 in the base platform 31 and has stopped, the upper carriage 42 continues to move downwardly until the upper resilient ring 43 carried thereby contacts the upper open end of the pressure chamber 51 so as to form an airtight seal therewith. Also mounted on the under surface of the upper carriage 42 and within the resilient ring 43 thereof is a holder 41 which is positioned so as to carry the lead-in electrode 9 with the glass bead 17 fused thereto downwardly with the carriage and insert it into the tubulation 21 being held in the bore 33 in the base platform 31. It will thus be appreciated that in addition to providing and maintaining alignment between the two carriages and the base platform in order to provide airtight sealing therebetween in the "closed" position, alignment must also be obtained and maintained between the upper holder 41 and the lower holder or bore 33 in order to obtain the correct and precise insertion of the beaded lead-in electrode 9 into the tubulation 21. Such alignment is obtained and maintained by the apparatus of the present invention.

The upper holder 41 comprises a U-shaped magnetic member 44 mounted and secured by a bracket 45 to the under surface of the upper driving carriage 42. The U-shaped member 44 is positioned so that its legs are vertically disposed with respect to each other and extend outwardly away from the bracket 45 and facing the operator of the apparatus. A vertically aligned channel or groove is provided in each of the faces of the legs in order to receive and properly position the lead-in electrode 9 for insertion into the tubulation 21 when the upper carriage 42 is in the "full down" or "closed" position. A clamping lead 44' is also provided and is hinged to the U-shaped member 44 to close over the electrode 9 when aligned in the vertically disposed channel.

Secured to and on the upper surface of the upper carriage 42 is a bracket 46 having a vertically extending portion 49 which is provided with a hole therein. The bracket 46, and hence the upper carriage 42 is connected to a fork member 47 by means of a pin or bolt which is secured in the fork member 47 and passes through the hole in the vertical portion 49 of the bracket 46 when the fork member 47 is positioned therearound. The fork member 47 is threadedly attached, for example, to a driving piston arm or rod 48 which is connected to actuating means (not shown) such as an air cylinder, for example.

Also provided within the upper carriage 42 is an internal channel or passageway 50 having terminal openings in the front lateral surface and in the under surface of the upper carriage. The opening in the under surface of the carriage is positioned within the resilient ring 43 thereof. A pressure gauge 55 is threadedly secured into comunication with the channel 50 so as to permit indication of the pressure within the pressure chamber 51 when the apparatus is in the closed position thereof. Air or some other suitable gas is introduced into the chamber 78 which in turn communicates to the pressure chamber 51 by means of a channel or passageway 80 which is provided in the base platform 31. The gas is pumped into the chamber 78 by means of the tubing 81 which is connected to a pump (not shown) through an electrically operated solenoid valve (also not shown).

Figure 6:
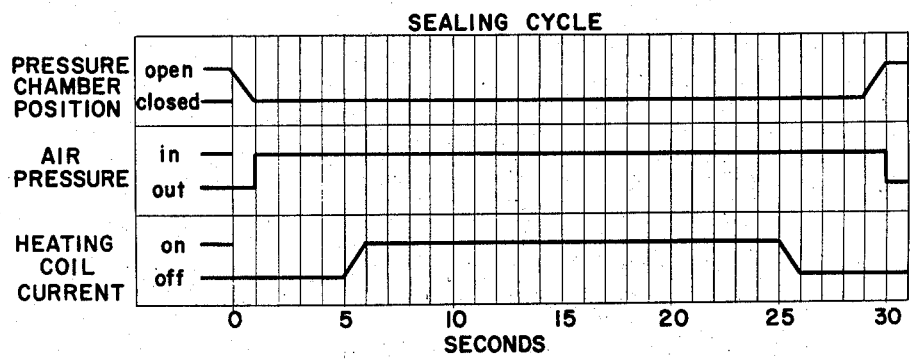
Figure 6 is a program chart showing the time relationships between the various operations of the apparatus shown in the foregoing figures when joining and sealing glass packages for semiconductor devices.

Referring now to Figure 6 the operation and the time relationships performed by the apparatus will be described. It will be understood that the functions of lowering the carriages 42 and 52 to form an air tight pressure region within the pressure chamber 51 around the components to be joined and sealed, establishing the desired pressure in this region, and energizing the heating coil to fuse the components may be controlled automatically by a timed electrical contact system (not shown). In operation, the lead-in electrode 9 with its glass bead 17 is loaded into the upper magnetic holder 41 with the glass bead 17 and whisker 7 depending therefrom and therebelow. The tubulation 21, containing the semiconductor body 3 and having the bead assembly 15—19 electrode-fused into the lower end of the tubulation 21, is inserted within the lower holder or bore 33 with the open end of the tubulation being uppermost. It will be appreciated that the disposition of the pressure chamber carriage 52 intermediate the upper carriage 42 and the base platform 31 in the "open" or "loading" position facilitates the loading of these components into their respective holders. Upon actuation of the time control mechanism, a solenoid-operated valve (not shown) is opened so as to admit air to an air cylinder (not shown) which begins to drive the upper carriage 42 downwardly from its "open" or "up" position. This downward movement of the upper carriage 42 also drives the pressure chamber carriage 52 downward into contact with the resilient ring 34 in the base platform 31 so as to result in the formation of an airtight seal therewith. The upper carriage 42 continues to travel downwardly, the holder 41 and the lead-in electrode-glass bead assembly 9—17 entering the pressure chamber 51 and ultimately being inserted into the open end of the tubulation 21 thus bringing the whisker 7 into contact with the upper surface of the semiconductor body 3 disposed therein. By proper adjustment of the distances between the carriages 42 and 52 the resilient ring 43 on the under surface of the upper carriage 42 may be brought into airtight contact with the open upper end of the pressure chamber 51 at about the same time as the whisker 7 contacts the semiconductor body 3. A downward force on the upper carriage 42 is maintained throughout the "closed" or "down" position so as to insure the airtightness of the seals formed by the resilient rings 34 and 43 with the pressure chamber 51. By a solenoid (not shown) air is admitted through the base platform 31 and into the pressure chamber 51 so as to provide a pressure of about 45 pounds per square inch, for example, in the pressure chamber 51 and within the as yet unsealed tubulation 21. Approximately 5 seconds, for example, after establishment of the desired air pressure in the pressure chamber, the timing control mechanism permits the heating coil 32 to be energized to cause the fusion of the glass bead 17 to the tubulation 21. The time required to obtain satisfactory fusion and sealing of the components described in connection with the diode device such as shown in Figure 1 is about 18–20 seconds. Thereafter the heating coil 32 is de-energized and the fused components are allowed to "set" or harden for about 5 seconds while the air pressure therearound is maintained. If the pressure is reduced before the joined components have hardened or "set," bulging or bursting of the temporarily softened walls of the tubulation 21 is apt to occur due to the internal pressure in the tubulation being greater than the external pressure therearound. After satisfactory fusion of the components the upper carriage 42 is drawn upwardly to the "open" position, thus releasing the pressure in the pressure chamber 51. The sealed diode may then be removed from the lower holder or bore 33 where it will remain after being sealed. The apparatus may then be reloaded as before and the operation repeated. It will be noted from the cycle chart shown in Figure 6 that the whole operation takes about 31 seconds per diode.

Figure 7:
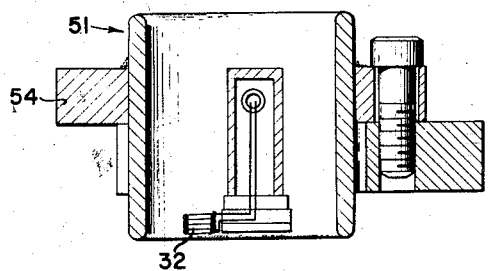
Figure 7 is a cross-sectional elevational view of the pressure chamber of the apparatus of the invention according to another embodiment thereof.

While the heating coil 32 has been shown and described as being positioned on the base platform 31, it may be mounted within the pressure chamber 51 as shown in Figure 7. In this embodiment, the coil 32 is arranged and positioned so as to descend around the tubulation 21 which is in the lower holder or bore 33 when the pressure chamber 51 moves downwardly. An advantage of this arrangement is that the loading and unloading of components through a dangerously hot and somewhat exposed heating coil is avoided.

There thus has been shown and described an improved apparatus for automatically and rapidly joining and sealing the components of a semiconductor package in an atmosphere under pressure so as to provide any desired pressure in the package while maintaining precise alignment between the components and simultaneously providing the proper contact pressure between the operative elements of the device itself.

What is claimed is:

1. Apparatus for joining objects to each other in an atmosphere under pressure comprising: a movable support for one of said objects, a fixed support for another of said objects, movable chamber-forming means disposed between and spaced from said supports in a first position, means for moving said movable support and said chamber-forming means to a second position whereby said objects are brought into contact with each other and said supports are brought into airtight contact with said chamber-forming means to form an airtight chamber around said contacted objects, means for establishing an atmosphere under pressure in said chamber, and means for integrally joining said contacted objects to each other.

2. Apparatus for joining objects to each other in an atmosphere under pressure comprising: a movable support for one of said objects, a fixed support for another of said objects, a movable open-ended chamber disposed between and spaced from said supports in a first position with the open ends thereof facing said supports, means for moving said movable support and said open-ended chamber to a second position whereby said objects are brought into contact with each other in said chamber and whereby said supports hermetically close-off the open ends of said chamber, means for establishing an atmosphere under pressure in said chamber, and means for integrally joining said contacted objects to each other.

3. Apparatus for joining objects to each other in an atmosphere under pressure comprising: a movable support for one of said objects, a fixed support for another of said objects, movable open-ended chamber-forming means disposed between and spaced from said supports in a first position, said open-ended chamber being adapted to be moved by and with said movable support a predetermined distance, means for moving said movable support and hence said open-ended chamber to a second position whereby said objects are brought into contact with each other in said chamber and whereby said supports hermetically close-off the open ends of said chamber, means for establishing an atmosphere under pressure in said chamber, and means for integrally joining said contacted objects to each other.

4. Apparatus for joining objects to each other in an atmosphere under pressure comprising: a movable support for one of said objects, a fixed support for another of said objects, movable chamber-forming means disposed between and spaced from said supports in a first position, means for moving said movable support and said chamber-forming means to a second position whereby said objects are brought into contact with each other and said supports are brought into airtight contact with said chamber-forming means to form an airtight chamber around said contacted objects, means for admitting a gas under pressure in said chamber, and means for heating said contacted objects to cause the integral joining thereof to each other.

5. Apparatus for joining objects to each other in an atmosphere under pressure comprising: a movable support for one of said objects, a fixed support for another of said objects, movable chamber-forming means disposed between and spaced from said supports in a first position, means for moving said movable support and said chamber-forming means to a second position whereby said objects are brought into contact with each other and said supports are brought into airtight contact with said chamber-forming means to form an airtight chamber around said contacted objects, means for admitting a gas under pressure in said chamber, and heating means disposed on said fixed support and positioned around said objects in said chamber.

6. Apparatus for joining objects to each other in an atmosphere under pressure comprising: a movable support for one of said objects, a fixed support for another of said objects, a movable open-ended chamber disposed between and spaced from said supports in a first position with the open ends thereof facing said supports, means for moving said movable support and said open-ended chamber to a second position whereby said objects are brought into contact with each other in said chamber and whereby said supports hermetically close-off the open ends of said chamber, means for admitting a gas under pressure in said chamber, and means for heating said contacted objects to cause the integral joining thereof to each other.

7. Apparatus for joining objects to each other in an atmosphere under pressure comprising: a movable support for one of said objects, a fixed support for another of said objects, a movable open-ended chamber disposed between and spaced from said supports in a first position with the open ends thereof facing said supports, means for moving said movable support and said open-ended chamber to a second position whereby said objects are brought into contact with each other in said chamber and whereby said supports hermetically close-off the open ends of said chamber, means for admitting a gas under pressure in said chamber, and heating means disposed on said fixed support and positioned around said objects in said chamber.

8. Apparatus for joining glass package components to each other in an atmosphere under pressure comprising: a first carriage slidably mounted on guide members and having means thereon to support one of said package components, an immovable base member having means to support another of said package components, a second carriage slidably mounted on said guide members and disposed between and spaced from said first carriage and said base member in a first position, an open-ended chamber mounted on said second carriage and in alignment with said support means on said first carriage and said base member, means flexibly securing said carriages to each other whereby said second carriage may be moved to a predetermined distance by said first carriage to second position so as to bring one of the open ends of said chamber into airtight contact with said base member while said first carriage may continue to move into airtight contact with the other of said open ends of said chamber, the movement of said first carriage thereby bringing said package components into contact with each other and forming an airtight chamber around the support means on said first carriage and the support means on said base, means for moving said first carriage, means for heating said contacted package components, and means for establishing an atmosphere under pressure in said chamber.

References Cited in the file of this patent

UNITED STATES PATENTS

| | | |
|---|---|---|
| 586,633 | Sterne | July 20, 1897 |
| 2,018,113 | Bardet et al. | Oct. 22, 1935 |
| 2,523,903 | Ellwood | Sept. 26, 1950 |